United States Patent
Roodenburg et al.

(10) Patent No.: US 9,617,809 B2
(45) Date of Patent: Apr. 11, 2017

(54) FLEXIBLE HYDROCARBON PIPELINE STORAGE INSTALLATION

(71) Applicant: ITREC B.V., Schiedam (NL)

(72) Inventors: Joop Roodenburg, Delft (NL); Terence Willem August Vehmeijer, The Hague (NL); Hubertus Lourens Leendert Tieleman, Noordgouwe (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 14/437,460

(22) PCT Filed: Nov. 7, 2013

(86) PCT No.: PCT/NL2013/050793
§ 371 (c)(1),
(2) Date: Apr. 21, 2015

(87) PCT Pub. No.: WO2014/073959
PCT Pub. Date: May 15, 2014

(65) Prior Publication Data
US 2015/0285012 A1    Oct. 8, 2015

(30) Foreign Application Priority Data

Nov. 12, 2012   (NL) ..................... 2009791

(51) Int. Cl.
*F16L 1/20* (2006.01)
*B63B 25/00* (2006.01)
*E21B 19/22* (2006.01)

(52) U.S. Cl.
CPC ............. *E21B 19/22* (2013.01); *B63B 25/00* (2013.01); *F16L 1/202* (2013.01); *F16L 1/203* (2013.01); *Y10T 29/49817* (2015.01)

(58) Field of Classification Search
CPC ....... F16L 1/12; F16L 1/23; F16L 1/14; F16L 1/15; F16L 1/202; F16L 1/207
See application file for complete search history.

(56) References Cited

U.S. PATENT DOCUMENTS 2,407,353 A * 9/1946 Wagner .................. B65H 54/80
                                                            242/361.5
3,765,614 A * 10/1973 Bartl ...................... A01K 73/06
                                                              242/361

(Continued)

FOREIGN PATENT DOCUMENTS

DE    19835711 A1    12/1999
GB     2229403 A      9/1990

(Continued)

*Primary Examiner* — Tara M. Pinnock
(74) *Attorney, Agent, or Firm* — Birch, Stewart, Kolasch & Birch, LLP

(57) ABSTRACT

The present invention relates to a vessel comprising a flexible hydrocarbon pipeline storage installation. The flexible hydrocarbon pipeline storage installation comprises an annular storage device, the storage device comprising an opening, and a tensioner, adapted to exert a pulling force on a pipeline, comprising two or more tensioner tracks defining therebetween a pipeline passage, extending between a loading end and an opposed storage end of the tensioner. The flexible hydrocarbon pipeline storage installation further comprises a pipeline loading guide, provided near the tensioner, for guiding the pipeline during loading the pipeline into the annular storage device. According to the invention, the tensioner is arranged to have an essentially vertical pipeline passage, wherein the storage end of the tensioner is situated above the opening of the annular storage device, and wherein the pipeline loading guide is provided near the loading end of the tensioner.

14 Claims, 5 Drawing Sheets

(56) References Cited

U.S. PATENT DOCUMENTS

| | | | | |
|---|---|---|---|---|
| 4,165,830 | A | * | 8/1979 | Svendsen ............. B65H 75/364 226/187 |
| 5,013,186 | A | * | 5/1991 | Kakizaki ................. B63B 35/04 405/158 |
| 8,104,995 | B2 | * | 1/2012 | Roodenburg ............. F16L 1/23 226/172 |
| 2013/0251456 | A1 | * | 9/2013 | Haugen ..................... F16L 1/16 405/166 |

FOREIGN PATENT DOCUMENTS

| WO | WO 03/019061 A1 | 3/2003 |
|---|---|---|
| WO | WO 2007/108673 A1 | 9/2007 |

\* cited by examiner

FLEXIBLE HYDROCARBON PIPELINE STORAGE INSTALLATION

The present invention relates to a vessel comprising a flexible hydrocarbon pipeline storage installation according to the preamble of claim 1, and a method of loading a flexible pipeline according to claim 6.

Such a flexible hydrocarbon pipeline storage installation on a vessel is generally known and commercially available. These devices comprise a so-called mushroom, comprising a semi-circular pipeline loading guide onto which a tensioning device having a horizontal pipeline passage is mounted. Such a mushroom-type storage device is used to load flexible pipelines from the shore to an annular storage device. This loading may also be referred to as spooling. The mushroom pulls the flexible pipeline from the shore and maintains sufficient back tension for correct spooling of the pipeline in the annular storage device. To unload the pipeline from the storage device, a separate unloading mushroom may be provided, comprising a semi-circular pipeline unloading guide onto which a tensioning device having a horizontal pipeline passage is mounted. A disadvantage of this configuration is the large amount of deck space required. Hence, the footprint of the flexible hydrocarbon pipeline storage installation required in addition to the storage device is large. Alternatively, it could be considered to alter the position of the entire mushroom from a loading position to an unloading position. In view of the heavy weight of such a mushroom, this is far less advantageous.

The present invention aims to provide an improved configuration for a vessel comprising a flexible hydrocarbon pipeline storage installation. According to the present invention, the tensioner is arranged to have an essentially vertical pipeline passage, wherein the storage end of the tensioner is situated above the opening of the annular storage device, and wherein the pipeline loading guide is provided near the loading end of the tensioner.

This configuration has the advantage that a single tensioner of the flexible hydrocarbon pipeline storage installation according to the invention is not only suitable for loading the pipeline, but also for unloading the pipeline from the annular storage device. During loading the pipeline the tensioner pulls the flexible pipeline and maintains sufficient back tension for correct spooling. During unloading, the tensioner helps to guide the pipeline from the annular storage device.

The annular storage device of the invention may be of a so-called basket-type or a carousel-type. A basket-type storage device comprises an annular space, provided with a bottom and side walls, and an upper end which is at least partially open. The storage device may be provided with pipeline guide means, for loading the pipeline in concentric rings. Drive means allow the basket to rotate. To pull the pipeline from a basket, a tensioner is required to pull.

When a basket-type storage is provided on deck of the vessel, it is conceivable that the opening permitting the loading of the pipeline thereinto is formed by the entire upper end of a basket-type storage device, or part of the at least partially open upper end. It is also conceivable that the basket type storage has a closed upper end, which is provided with a hatch to permit the loading of the pipeline thereto. This is also a possible option when the basket-type storage is provided below deck: a hatch may be provided in the deck above the open upper end of the basket to define the opening to permit the loading of the pipeline thereto.

A carousel-type storage device comprises an upper and lower flange, between which the pipeline is spooled. The carousel may be provided with a winch to pull the pipeline. Between the flanges, at least part of the circumferential side of the carousel-type storage device is open, so as to permit the loading of the pipeline. A carousel-type storage thus has the opening at the side. According to the invention, the tensioner is situated above this opening end, such that the pipeline follows a curved downwards path into the storage device. It is conceivable that in the curved downward path the pipeline is guided via a pipeline guide, such as a chute, from the tensioner into the carousel-type storage device, and optionally also vice versa. In general, it is noted that the tensioner is preferable arranged adjacent the opening of the carousel-type storage device to allow the loading and unloading of the pipeline.

The storage device may be positioned in a hull of the vessel. When the storage device is provided below deck, the upper end of the storage device is preferably accessible via a hatch, above which the tensioner is provided.

Possibly, the storage device extends substantially over the entire width of the vessel, wherein the vertical axis is essentially provided at the longitudinal axis of the vessel. It is conceivable that a single vessel is provided with multiple pipeline storage devices, e.g. provided adjacent each other wherein each vertical axis is essentially provided at the longitudinal axis of the vessel. In a preferred embodiment, the storage end of the tensioner is provided above the openings of multiple storage devices.

According to the invention, the storage end of the tensioner is situated above the opening of the annular storage device. In particular, the storage end of the tensioner is situated near the storage device, more particularly higher than the storage device, possibly in a vertical direction essentially straight above the opening of the storage device. In the case a hatch is provided to close the opening of the annular storage device, the tensioner is thus preferably provided straight above this hatch. Thus, during loading the pipeline moves downwards from the tensioner through the opening, and during unloading the pipeline moves upwards out of the storage device, via the opening, to and through the tensioner.

When the annular storage device is provided below deck, it is both conceivable that the tensioner is provided on deck, or provided partially below deck, as long as the storage end of the tensioner is situated above the opening of the annular storage device. When the annular storage device is provided on deck, it is conceivable that the tensioner is provided on an elevated frame on deck, or even on top of the annular storage device, as long as the storage end of the tensioner is situated above the opening of the annular storage device.

In an embodiment, it is conceivable that the vessel is also provided with a flexible pipelay installation. The tensioner with the essential vertical pipeline passage enables the unloading of a pipeline to the flexible pipelay installation. Configurations are conceivable, wherein no additional pipeline guiding means are provided in the pipeline path between the loading end of the tensioner and the flexible pipelay installation.

In a possible embodiment, the flexible hydrocarbon pipeline storage installation further comprises a pipeline unloading guide, provided between the annular storage device and the flexible pipelay installation, and provided near the loading end of the tensioner, for guiding the pipeline during unloading the pipeline from the annular storage device. The pulling operation of the tensioner between the storage device and the pipeline unloading guide prevents sagging of the pipeline between the flexible pipelay installation and the storage device.

In a possible configuration, the pipeline unloading guide extends essentially parallel to the longitudinal axis of the vessel. Preferably, also the pipeline loading guide extends essentially parallel to the longitudinal axis of the vessel, opposite the pipeline unloading device.

It is preferred to adapt the shape and configuration of the pipeline guides for loading and unloading to its respective purposes. Preferably, the unloading guide is distinct from the pipeline loading guide. However, it is also conceivable that the pipeline loading guide is also used as a pipeline unloading guide. Possibly, the position of the pipeline loading guide can be changed.

Additional pipeline guiding means may be provided on the vessel, e.g. a guide in the pipeline path before the pipeline loading guide, upon loading the pipeline. Such a guide may assist in the prevention of cracking.

The vessel according to the present invention is preferably a monohull vessel. It is conceivable that the vessel is a dedicated pipeline storage vessel, cooperating with a pipelaying vessel comprising a flexible pipelay installation. However, preferably the vessel according to the present invention comprises both a flexible hydrocarbon pipeline storage installation and a flexible pipelay installation.

The flexible hydrocarbon pipeline storage installation according to the present invention comprises an opening, so as to permit loading of the pipeline thereinto, and possibly also unloading of the pipeline therefrom. The storage device is rotatable about a vertical axis by a drive, e.g. an electromotor.

Generally, a pipeline is loaded from the shore, over the rear end of the vessel, into the storage device. Alternatively, it is also conceivable that the pipeline is loaded over a sideboard or over the front end of the vessel. The pipeline may be loaded from the shore, but alternatively the pipeline may also be transferred from one pipeline storage vessel to another vessel, according to the present invention.

A tensioner is provided for pulling the pipeline to and/or from the storage device. It is conceivable that additional pipeline pulling means are provided, such as the drive of the annular storage device, in particular a storage device of the carousel type, although in general the pulling force that can be exerted by such a drive is not sufficient.

The tensioner can be any more or less conventional type, wherein the tensioner comprises at least two tensioner tracks for pulling the pipeline, which can be set to a determined pipe diameter, e.g. using hydraulic cylinders. The tensioner is preferably capable of pulling flexible pipelines having a diameter between 40 and 800 mm, more preferably between 50 and 650 mm. The tensioner preferably comprises 2-4 tensioner tracks, defining there between a pipeline passage having a length of 3-5 meters, preferably 3,5 meter. The tensioner has a loading end where the pipeline enters the tensioner upon loading, and an opposed storage end of the tensioner, where the pipeline exits the tensioner and moves towards the storage device upon loading the pipeline. When unloading the pipeline, the pipeline enters the tensioner at the storage end and exits the tensioner at the opposed loading end. The pulling speed of the tensioner may vary between 5 and 50 m/min, more preferably between 10 and 30 m/min. The tensioners tracks are preferably driven by electromotors.

The tensioner may be of any configuration comprising two or multiple tracks. It is conceivable that the flexible hydrocarbon pipeline storage installation comprise more than one tensioner, e.g. multiple tensioners having a vertical pipeline passage above each other, or comprising both tensioners having a vertical, and additionally tensioners having a horizontal pipeline passage.

In a preferred embodiment, the tensioner comprises a frame, mounted to the vessel, and movable subframes, equipped with the tensioner tracks, which can preferably be set to a determined pipe diameter, e.g. using hydraulic cylinders.

The flexible hydrocarbon pipeline storage installation according to the present invention comprises a pipeline loading guide, provided near the tensioner, for guiding the pipeline during loading the pipeline into the annular storage device. In addition, the device comprises a pipeline unloading guide, provided between the annular storage device and a flexible pipelay installation, for guiding the pipeline during unloading the pipeline from the annular storage device.

The pipeline guides are preferably embodied as curved roller tracks, of a semi-circular shape or quarter-circular shape. The semi-circular shape is in particular advantageous when the pipeline guide is to be moved away. In particular when flexible pipeline portions having an enlarged diameter are to be handled, the area above the opening of the storage device is to be cleared to allow this pipeline portion to enter the storage device, and hence the tensioner and the above the tensioner situated pipeline guide or pipeline guides are to be moved away.

When loading of the pipeline takes place from the rear end of the vessel, the loading pipeline guide extends essentially parallel to the longitudinal axis of the vessel. As is preferred, the flexible pipelay installation is installed on the same vessel. In a preferred configuration, the one or more pipeline storage devices is/are provided at the rear end of the vessel, and the pipelay installation at the front end of the vessel. As such, the pipeline unloading guide also extends essentially parallel to the longitudinal axis of the vessel, essentially opposite the pipeline loading guide.

Alternatively, it is conceivable that the vessel according to the present invention is provided adjacent another vessel comprising the flexible pipelay installation, and that the pipeline unloading guide thus extends in the direction of this other vessel.

The vessel is preferably also suitable of handling flexible pipeline portions having an enlarged diameter, e.g. portions having a pipeline connector fitted to it. Such pipeline connectors may be 10-15 metres long, and have a weight of 10-20 tons. In an embodiment, the vessel is furthermore provided with a crane, which is at least suitable for handling such pipeline portions having an enlarged diameter. In this embodiment, at least one of the tensioner tracks is provided moveable between a closed operative position for pulling the pipeline, and an open retracted position, allowing the pipeline portion having an enlarged diameter to pass the tensioner. Preferably, the tensioner comprises two tracks, which are both movable between the closed operative and open retracted position.

For loading purposes, the crane should be able to connect the pipeline portion having an enlarged diameter prior to being lowered into the storage device. Possibly, the crane should reach to the shore where the pipeline portion having an enlarged diameter is offered. Alternatively, it is conceivable that the pipeline portion having an enlarged diameter can be guided over the stern (rear side) of the vessel by conventional means, such that the crane only needs to reach towards the end of the pipeline loading guide. Possibly, the pipeline portion having an enlarged diameter can also be guided over this pipeline loading guide, such that the crane can connect the end portion at the end of the pipeline loading guide, just above the tensioner.

For unloading purposes, the crane should be able to bring the pipeline portion having an enlarged diameter to the flexible pipelay installation. It is conceivable that another crane is provided for handling the pipeline portion having an enlarged diameter, e.g. provided on top of the flexible pipelay installation, of taking over the pipeline portion having an enlarged diameter from the crane connecting the pipeline portion having an enlarged diameter in the storage device.

In an embodiment, one or more tensioner tracks are movably mounted in a stationary frame, which is attached to the deck, e.g. by pinned connections.

In an embodiment, the at least one tensioner track is rotatable about a vertical rotation axis, e.g. 60-120°, preferably 80-100°, most preferred about 90°. Preferably, two tensioner tracks are provided, which are both allowed to rotate 90° sideways, and thus providing a clear area for the pipeline portions having an enlarged diameter.

In an embodiment, the pipeline loading guide is mounted to a first movable tensioner track, and the pipeline unloading guide is mounted to a second movable tensioner track, such that the pipeline loading guide and the pipeline unloading guide are also movable between an operative position above the tensioner and a retracted position, allowing the passage of pipeline portions having an enlarged diameter. As such, the pipeline guides move together with the tracks, and no additional construction is required to move the pipeline guides apart.

The invention also relates to a method of loading a flexible pipeline having at least one pipeline portion having an enlarged diameter into the annular storage device of a vessel according to claim 5, and a method of unloading a flexible pipeline having at least one pipeline portion having an enlarged diameter from the annular storage device of a vessel according to claim 5.

The invention will be further described in relation to the drawings, in which.

Figure 1:
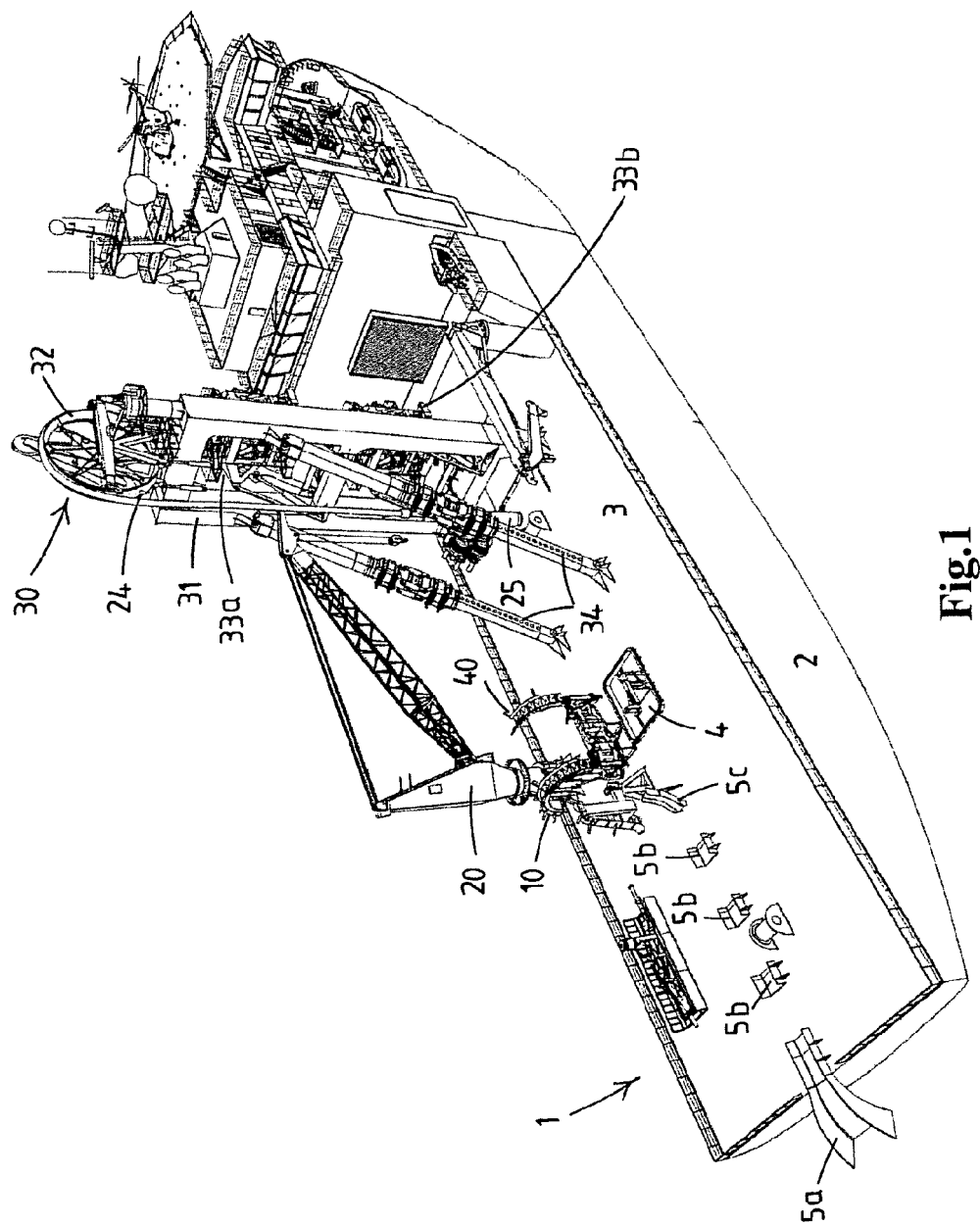
FIG. 1 shows a perspective view of an embodiment of a vessel according to the invention, in which the tensioner is in a retracted position.

In FIG. 1 a perspective view of a vessel 1 according to the present invention is shown. The vessel 1 is a monohull vessel, comprising a hull 2 and a deck 3. In the hull 2, an annular storage device is provided, which is not visible due to its location in the hull 2. The annular storage device is rotatable about a vertical axis by a drive (not shown). The annular storage device has an opening, so as to permit the loading of the pipeline. In the shown embodiment, an opening 4 is provided in the deck 3 of the vessel, through which the pipeline may be loaded and unloaded. In case a basket-type storage device is applied, having an open upper end, the opening 4 in the deck corresponds to the opening of the storage device permitting loading and unloading. In case a carousel-type storage device is applied, the opening 4 in the deck is situated above the opening of the carousel-type storage device, allowing the loading and unloading of the pipeline via the opening and via the opening.

Additionally, on deck 3 a flexible pipelay installation 30 is provided. The flexible pipelay installation 30 in this embodiment comprises an essentially vertical tower 31, provided with an aligner wheel 32 and two tensioners 33a, 33b. In a not shown embodiment it is also conceivable that the flexible pipelay installation is provided with an aligner chute. The orientation of the tower 31 can be adjusted by adjusters 34. In the deck 3 of the vessel a moonpool (not visible) is provided below the tensioners, such that the pipeline may enter the sea in a firing line extending through the tensioners 33a, 33b and the moonpool.

The vessel 1 and hydrocarbon pipeline storage installation as shown in the drawings 1-5 is suitable for both loading a pipeline, e.g. from the shore, via the stern of the vessel, and via opening 4 in the deck into the annular storage device in the hull of the vessel, and for unloading the pipeline, from annular storage device, to the flexible pipelay installation 30. In particular, the vessel 1 and hydrocarbon pipeline storage installation as shown in the drawings 1-5 is suitable for handling flexible pipeline portions having an enlarged diameter, e.g. portions having a pipeline connector fitted to it.

Figure 2A:
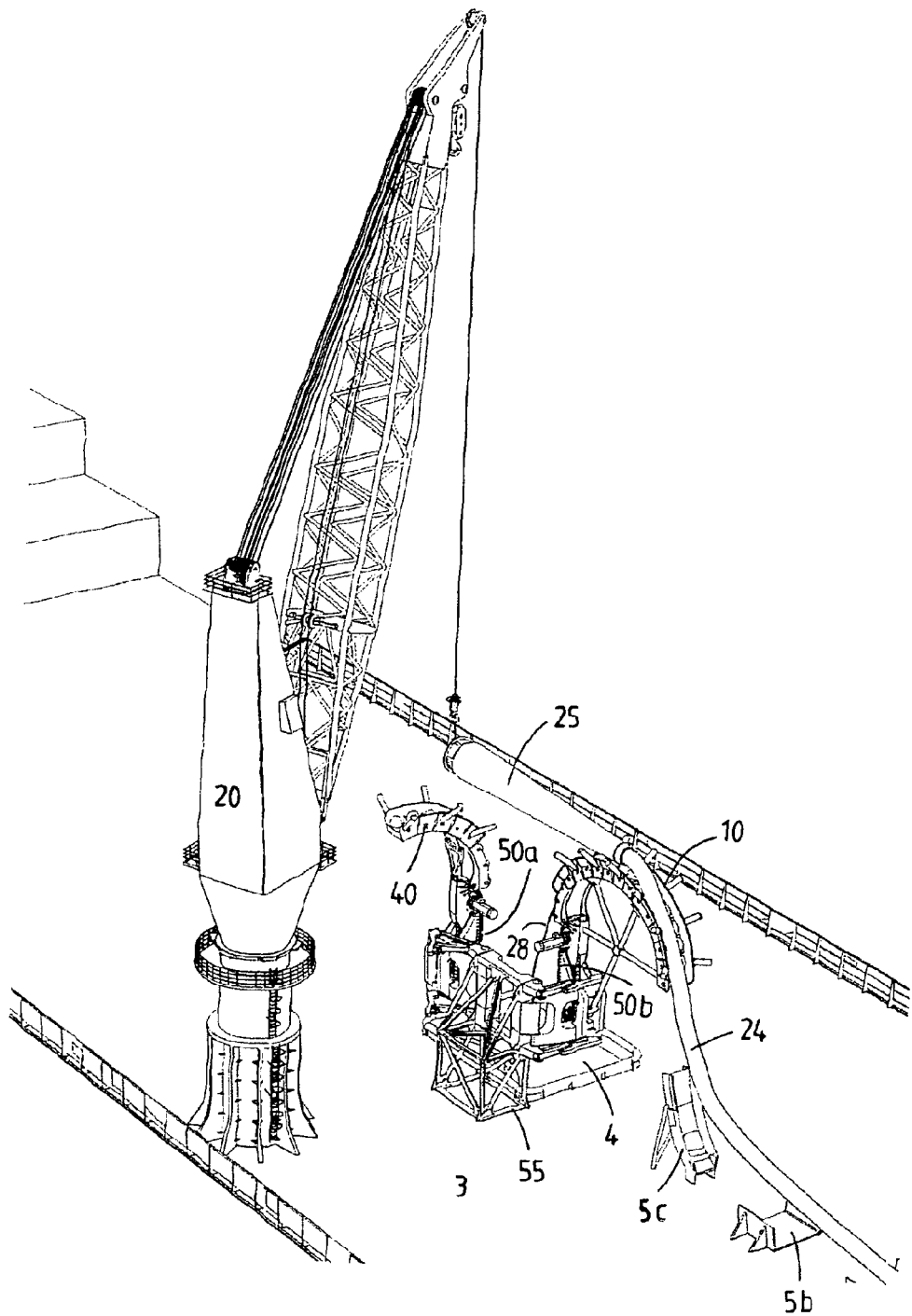
FIGS. 2a and 2b show distinct perspective views of a detail of the vessel of FIG. 1, in which a pipeline is being loaded onto the vessel.
Figure 2B:
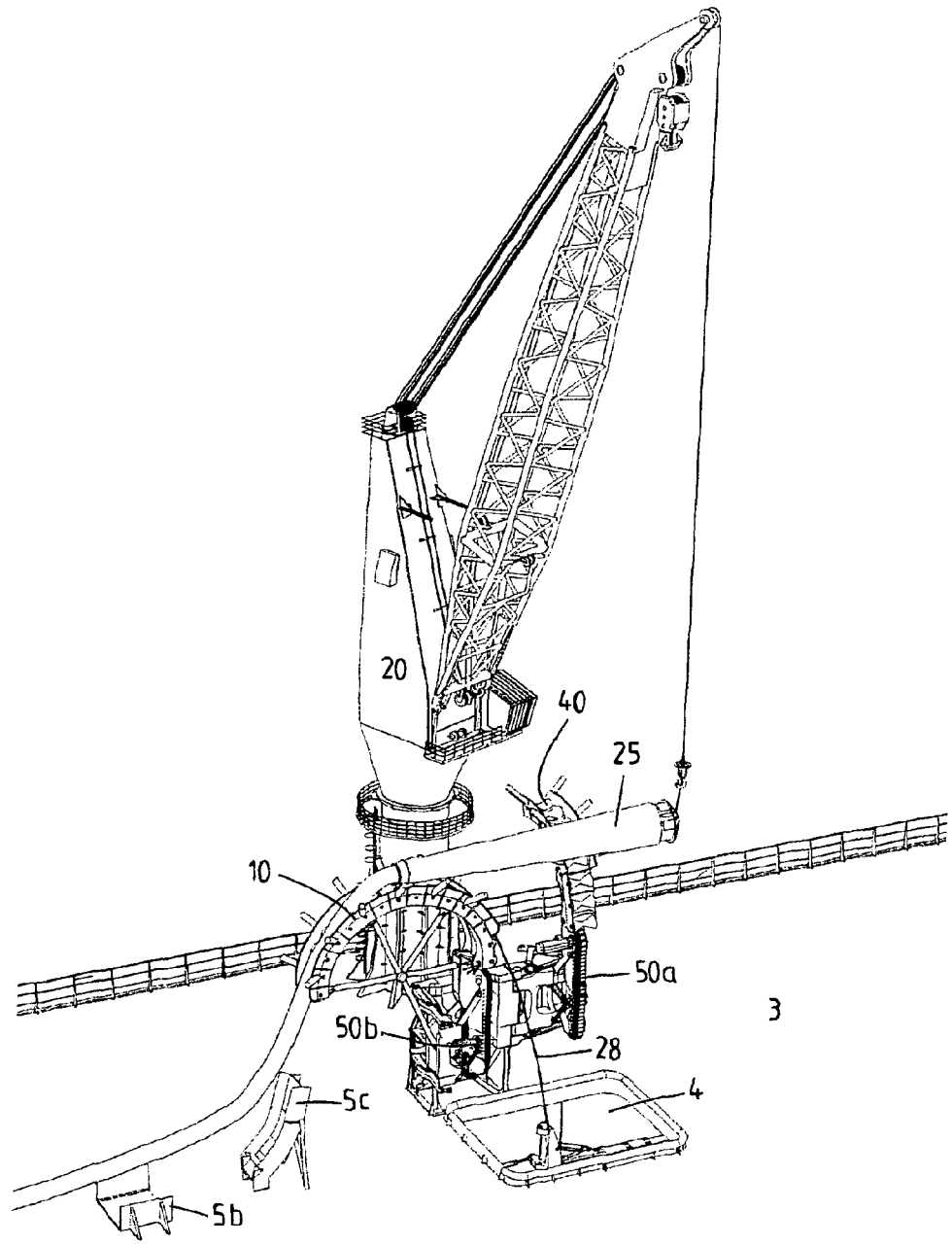

Such a pipeline connector 25 is hardly visible in FIG. 1, adjacent the flexible pipelay installation 30, but shown in detail in FIGS. 2a and 2b.

Furthermore, on deck 3 of the vessel 1, a crane 20 is provided, which is at least suitable for handling such flexible pipeline portions having an enlarged diameter.

Figure 4A:
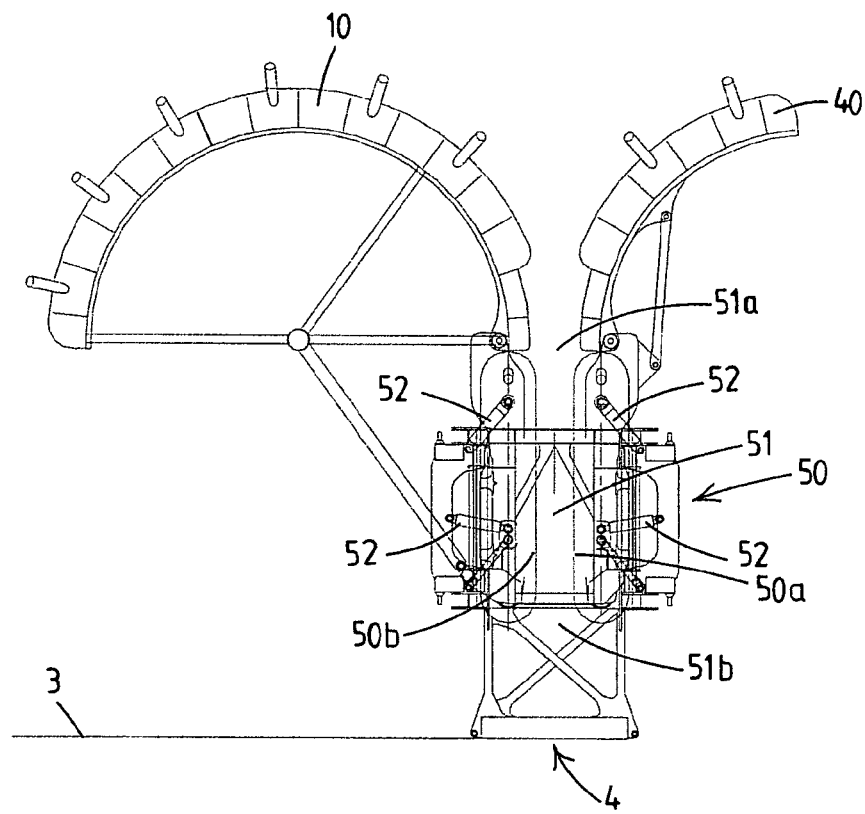
FIGS. 4a and 4b show the ensemble of tensioner, pipeline loading guide and pipeline unloading guide in the operative position in a side view and a top view, respectively.

According to the present invention, a tensioner 50 is provided, which is adapted to exert a pulling force on a pipeline. The tensioner 50 is shown in detail in the side view of FIG. 4a. In the shown embodiment, the tensioner 50 comprises two tensioner tracks 50a, 50b, defining therebetween a pipeline passage 51. The pulling force on the pipeline is adjustable via cylinders 52. In the configuration of FIG. 4, the tensioner 50 is provided in a closed operative position in which it is adapted to exert a pulling force on the pipeline. The pipeline passage 51 extends between a loading end 51a and an opposed storage end 51b. The storage end 51 b of the tensioner is, according to the invention, situated above the opening of the annular storage device. In the shown embodiment, the storage end 51b is provided above the opening 4 of the deck.

Figure 3:
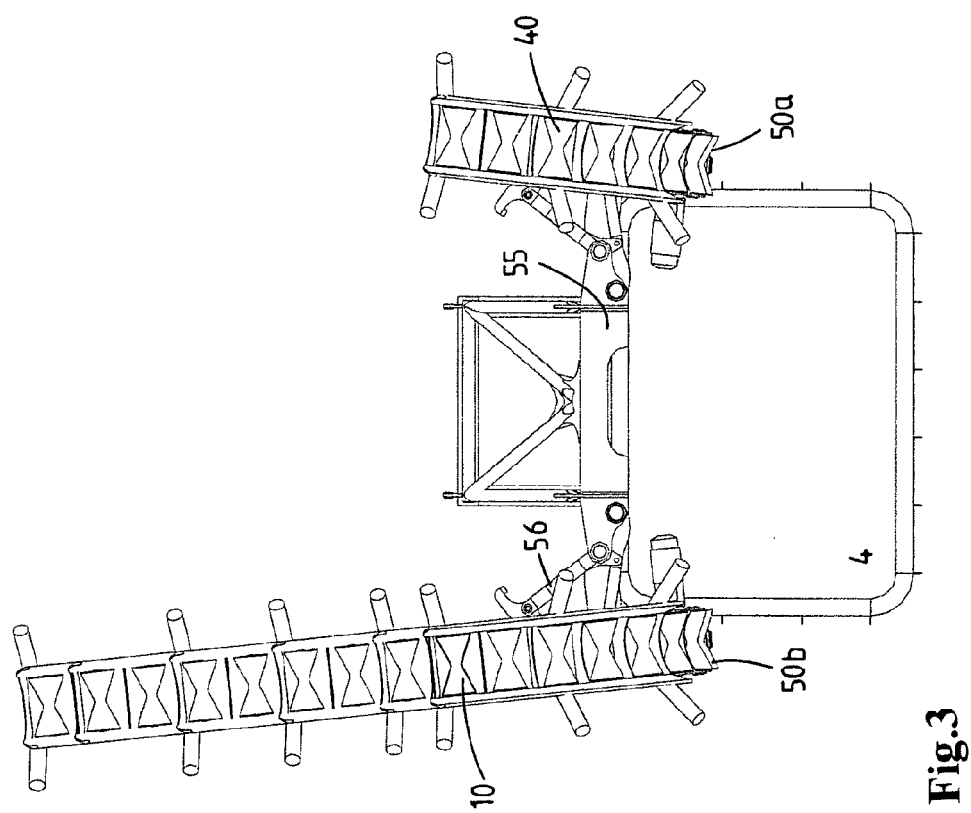
FIG. 3 shows the ensemble of tensioner, pipeline loading guide and pipeline unloading guide in the retracted position in a top view.
Figure 4B:
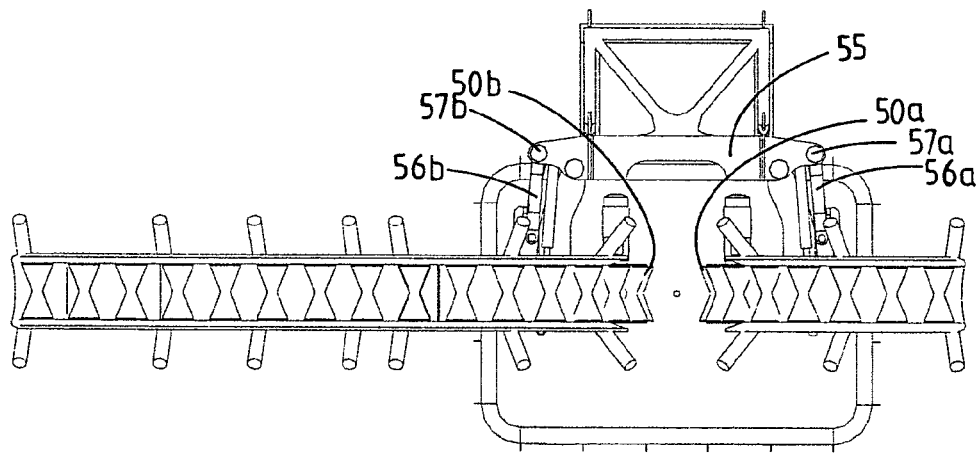

According to a preferred embodiment of the invention, the tensioner tracks 50a and 50b are provided moveable between the closed operative position of FIGS. 4a and 4b, and an open retracted position as visible in FIGS. 1 and 3, allowing the pipeline portion having an enlarged diameter to pass the tensioner. In the embodiment shown in FIGS. 2a and 2b, only one of the tensioner tracks is moved to the open retracted position, allowing the pipeline portion having an enlarged diameter to pass the tensioner.

In the shown embodiment, the tensioner tracks 50a are supported by a frame 55. The tensioner tracks 50a, 50b are rotatable about a vertical rotation axis 57a, 57b, respectively, by hydraulic cylinders 56a, 56b respectively. Alternatively, the tensioner tracks could also be moveable via translation means, or yet alternatively by the aid of a crane.

Furthermore, according to the present invention, the flexible hydrocarbon pipeline storage installation comprises a pipeline loading guide 10, provided near the loading end 51a of the tensioner 50, for guiding the pipeline during loading the pipeline into the annular storage device.

In addition, a pipeline unloading guide 40 is provided, provided between the opening of the annular storage device and the flexible pipelay installation 30, and provided near the loading end 51a of the tensioner, for guiding the pipeline during unloading the pipeline from the annular storage device. In the embodiment shown in FIG. 4, i.e. in the closed operative position of the tensioner, the pipeline unloading guide 40 extends essentially parallel to the longitudinal axis of the vessel, and also the pipeline loading guide 10 extends essentially parallel to the longitudinal axis of the vessel, opposite the pipeline unloading device 40.

According to a preferred embodiment of the invention, the pipeline loading guide 10 is mounted to a first movable tensioner track 50b, and the pipeline unloading guide 40 is mounted to a second movable tensioner track 50a, such that the pipeline loading guide 10 and the pipeline unloading guide 40 are also movable between an operative position above the tensioner 50, visible in FIGS. 4a and 4b, and a retracted position, visible in FIGS. 1 and 3, allowing the passage of flexible pipeline portions having an enlarged diameter. As noted above, in the embodiment shown in FIGS. 2a and 2b, only one of the tensioner tracks 50a with the pipeline unloading guide 40 is moved to the open retracted position, allowing the pipeline portion having an enlarged diameter to pass the tensioner, while the other tensioner track 5b and the pipeline loading guide 10 remain in position.

On deck 3 of the vessel 1, loading guide devices 5a, 5b, 5c are visible, which are available to assist in guiding the pipeline upon loading a pipeline via the guide device 5a provided at the stern of the vessel, and via guide devices 5b and guide device 5c to a pipeline loading guide 10 according to the present invention. The additional loading guide devices 5a, 5b and 5c are commonly applied devices.

The loading of a pipeline 24 provided with a connector 25 is visible in FIGS. 2a and 2b. The pipeline 24 is guided by the guide devices 5a, 5b and 5c, while the connector 25 is being held by the crane 20. In the shown embodiment, an additional guiding wire 28 is provided, which is connected to the pipeline 24 below the connector 25. The guiding wire 28 assists in guiding the pipeline over the pipeline loading guide 10, while the connector 25 is being held by the crane 20. The connector 25 is lifted past the pipeline loading guide 10 by the crane 20. Connector 25 is too large to be handled by the tensioner 50. Hence, the pipeline passage 51 defined by the tensioner tracks 50a and 50b is enlarged by moving the tensioner track 50a with the pipeline unloading guide 40 to the retracted position. Alternatively, it is also conceivable that both tensioner tracks are moved to the retracted position, similar to the situation shown in FIGS. 1 and 3. An even larger passage may be created this way. In the situation wherein only one tensioner track is retracted, visible in FIGS. 2a and in particular in FIG. 2b, it is evident that the thus created enlarged passage is large enough to allow the passage of the connector end 25. Once the connector end has passed the tensioner 50, the tensioner track 50a may be allowed to move back to the closed operative position to allow the loading of the pipeline 24.

At the trailing end of the pipeline 24, an additional connector end may be provided, which will also be handled in a similar way by the crane 20, and by opening the tensioner track 50a.

Upon unloading a pipeline with a pipeline portion having an enlarged diameter, it is conceivable that only tensioner track 50b with the pipeline loading guide 10 is moved to the retracted position, while the pipeline portion having the enlarged diameter is being handled by the crane. Alternatively, both tensioner tracks are moved to the retracted position.

Upon unloading, the pipeline is guided to the flexible pipelay installation 30. In particular, a leading end portion of the pipeline, e.g. a portion having an enlarged diameter, is brought, e.g. by the crane to the top of the flexible pipelay installation 30, here the aligner wheel 32.

From there, the pipeline is allowed to pass the tensioners 33a and 33b and guided into the sea. It is noted that, if applicable, these tensioners 33a and 33b should also be configures such that they allow the passage of the portion having an enlarged diameter.

In the situation in FIG. 1, the pipeline has been unloaded to the flexible pipelay installation 30, and only a connector 25 provided at the end of the pipeline 24 has yet to pass the aligner wheel 32. The assistance of an additional crane is also required to achieve this.

The invention claimed is:

1. A vessel comprising a flexible hydrocarbon pipeline storage installation, the flexible hydrocarbon pipeline storage installation comprising:
   an annular storage device, the storage device comprising an opening, so as to permit the loading of the pipeline;
   a tensioner adapted to exert a pulling force on a pipeline, comprising two or more tensioner tracks defining therebetween a pipeline passage, extending between a loading end and an opposed storage end of the tensioner,
   a pipeline loading guide, provided near the tensioner, for guiding the pipeline during loading the pipeline into the annular storage device, and
   a crane, at least suitable for handling flexible pipeline portions having an enlarged diameter, at least one of the tensioner tracks is provided moveable between a closed operative position in which it is adapted to exert a pulling force on the pipeline, and an open retracted position, allowing the pipeline portion having an enlarged diameter to pass the tensioner,
   wherein the tensioner is arranged to have an essentially vertical pipeline passage, wherein the storage end of the tensioner is situated above the opening of the annular storage device, such that the pipeline follows a curved downward path into the storage device, and wherein the pipeline loading guide is provided near the loading end of the tensioner,
   wherein the two or more tensioner tracks comprise a first movable tensioner track and a second movable tensioner track,
   wherein the pipeline loading guide is mounted to the first movable tensioner track, and
   wherein a pipeline unloading guide is mounted to the second movable tensioner track, such that the pipeline loading guide and a pipeline unloading guide are also movable between an operative position above the tensioner and a retracted position, allowing the passage of flexible pipeline portions having an enlarged diameter.

2. The vessel according to claim 1, wherein the vessel is provided with a flexible pipelay installation, and
   wherein the pipeline unloading guide is provided between the opening of the annular storage device and the flexible pipelay installation, and provided near the loading end of the tensioner, for guiding the pipeline during unloading the pipeline from the annular storage device.

3. The vessel according to claim 1, wherein the at least one tensioner track is rotatable about a vertical rotation axis.

4. A method of loading and unloading a flexible pipeline into the annular storage device of the vessel according to claim 1, said method comprising the steps of:
   providing a flexible pipeline near the vessel, the flexible pipeline comprising a leading end;

guiding the leading end of the flexible pipeline via the pipeline loading guide to the loading end of the tensioner;

actuating the tensioner such that the pipeline is being pulled by the tensioner through the opening of the annular storage device into the annular storage device;

providing the leading end of the flexible pipeline from the annular storage device to the storage end of the tensioner; and actuating the tensioner such that the pipeline is being pulled by the tensioner via the opening of the annular storage device from the annular storage device.

5. The method according to claim 4, wherein the vessel is provided with a flexible pipelay installation, and wherein the pipeline unloading guide is provided between the opening of the annular storage device and the flexible pipelay installation, and provided near the loading end of the tensioner, for guiding the pipeline during unloading the pipeline from the annular storage device, said method further comprising the step of guiding the leading end of the flexible pipeline and the flexible pipeline via the pipeline unloading guide to the flexible pipelay installation.

6. A method of loading a flexible pipeline having at least one pipeline portion having an enlarged diameter into the annular storage device of a vessel according to claim 1, said method comprising the steps of:

moving at least one of the tensioner tracks and the connected pipeline guide to the retracted position;

connecting a pipeline portion having an enlarged diameter to the crane;

lowering the pipeline portion having an enlarged diameter by the crane, through the retracted position of the tensioner, into the annular storage device;

closing the at least one of the tensioner tracks to the operative position;

disconnecting the pipeline portion having an enlarged diameter from the crane; and actuating the tensioner such that the pipeline is being pulled into the annular storage device.

7. The method according to claim 6, wherein the flexible pipeline comprises two pipeline portions having an enlarged diameter, the method comprising the further steps of:

actuating the tensioner such that the pipeline is being pulled into the storage device, until the second pipeline portion having an enlarged diameter is near the tensioner;

connecting the second pipeline portion having an enlarged diameter to the crane;

moving at least one of the tensioner tracks and the connected pipeline guide to the retracted position;

lowering the second pipeline portion having an enlarged diameter by the crane, through the tensioner, into the annular storage device; and disconnecting the second pipeline portion having an enlarged diameter from the crane.

8. A method of unloading a flexible pipeline having at least one pipeline portion having an enlarged diameter from the annular storage device of the vessel according to claim 1, said method comprising the steps of:

moving at least one of the tensioner tracks and the connected pipeline guide to the retracted position;

connecting pipeline portion having an enlarged diameter, situated in the storage device, to the crane;

raising the pipeline portion having an enlarged diameter by the crane, through the retracted position of the tensioner, and bringing pipeline portion having an enlarged diameter to the flexible pipelay installation;

closing the tensioner tracks to the operative position;

disconnecting the pipeline portion having an enlarged diameter from the crane; and actuating the tensioner such that the pipeline is being pulled from the storage device.

9. The vessel according to claim 1, wherein the annular storage device is positioned in a hull or onto a deck of the vessel, which is rotatable about a vertical axis by a drive.

10. The vessel according to claim 1, wherein the vessel is provided with a flexible pipelay installation.

11. The vessel according to claim 1, wherein the flexible pipeline portions have a pipeline connector fitted to them, and wherein at least one of the tensioner tracks is provided moveable between a closed operative position in which it is adapted to exert a pulling force on the pipeline, and an open retracted position, allowing the pipeline portion having an enlarged diameter to pass the tensioner.

12. The vessel according to claim 1, wherein the at least one tensioner track is rotatable about a vertical rotation axis of 60-120°.

13. The vessel according to claim 1, wherein the at least one tensioner track is rotatable about a vertical rotation axis of 80-100°.

14. The vessel according to claim 1, wherein the at least one tensioner track is rotatable about a vertical rotation axis of 90°.

* * * * *